US011346964B2

(12) United States Patent
Boardman et al.

(10) Patent No.: US 11,346,964 B2
(45) Date of Patent: May 31, 2022

(54) GAMMA-RAY IMAGING

(71) Applicant: Australian Nuclear Science and Technology Organisation, Lucas Heights (AU)

(72) Inventors: David Boardman, Lucas Heights (AU); Adam Sarbutt, Lucas Heights (AU); Alison Flynn, Lucas Heights (AU); Dale Prokopovich, Lucas Heights (AU)

(73) Assignee: Australian Nuclear Science and Technology Organisation, Lucas Heights (AU)

( * ) Notice: Subject to any disclaimer, the term of this patent is extended or adjusted under 35 U.S.C. 154(b) by 34 days.

(21) Appl. No.: 17/015,839

(22) Filed: Sep. 9, 2020

(65) Prior Publication Data

US 2020/0408940 A1  Dec. 31, 2020

Related U.S. Application Data

(63) Continuation of application No. 15/313,101, filed as application No. PCT/AU2015/000302 on May 22, 2015, now Pat. No. 10,795,036.

(30) Foreign Application Priority Data

May 22, 2014  (AU) .................... 2014901905

(51) Int. Cl.
| | |
|---|---|
| *G01T 1/29* | (2006.01) |
| *G21K 1/02* | (2006.01) |
| *G01T 1/161* | (2006.01) |
| *G01T 1/167* | (2006.01) |
| *G01V 5/00* | (2006.01) |
| *G21K 1/10* | (2006.01) |

(52) U.S. Cl.
CPC .............. *G01T 1/295* (2013.01); *G01T 1/161* (2013.01); *G01T 1/167* (2013.01); *G01V 5/0016* (2013.01); *G21K 1/02* (2013.01); *G21K 1/10* (2013.01)

(58) Field of Classification Search
CPC ......... G01T 1/295; G01T 1/161; G01T 1/167; G01V 5/0016; G21K 1/02; G21K 1/10; G21K 5/10
USPC .................................................... 250/370.09
See application file for complete search history.

(56) References Cited

U.S. PATENT DOCUMENTS

| | | | |
|---|---|---|---|
| 3,544,800 | A | 12/1970 | Elliottt |
| 3,799,675 | A | 3/1974 | Johnson |
| 4,769,829 | A | 9/1988 | Webb |
| 4,885,759 | A | 12/1989 | Tomoda |
| 4,995,066 | A | 2/1991 | Harding |
| 5,038,370 | A | 8/1991 | Harding |
| 5,606,165 | A | 2/1997 | Chiou |

(Continued)

FOREIGN PATENT DOCUMENTS

| | | |
|---|---|---|
| JP | H02122294 A | 5/1990 |
| JP | 2010-507811 A | 3/2010 |

OTHER PUBLICATIONS

Examination Report for KR App No. 9-5-2021-057864728 dated Jul. 22, 2021 (15 pages).

(Continued)

*Primary Examiner* — David P Porta
*Assistant Examiner* — Gisselle M Gutierrez
(74) *Attorney, Agent, or Firm* — Jonathan D. Ball; Greenberg Traurig, LLP

(57) ABSTRACT

A coded mask apparatus is provided for gamma rays. The apparatus uses nested masks, at least one of which rotates relative to the other.

21 Claims, 9 Drawing Sheets

(56) References Cited

U.S. PATENT DOCUMENTS

| | | |
|---|---|---|
| 6,272,206 B1 | 8/2001 | Bjorkham |
| 7,623,614 B2 | 11/2009 | Shefsky |
| 8,519,343 B1 | 8/2013 | Mihailescu |
| 10,133,936 B2 | 11/2018 | Hu |
| 2002/0075990 A1 | 6/2002 | Lanza |
| 2006/0124867 A1 | 6/2006 | Vanderberg |
| 2008/0012750 A1 | 1/2008 | Austin |
| 2008/0240535 A1 | 10/2008 | Frangioni |
| 2013/0021613 A1 | 1/2013 | Furxhi |
| 2013/0052592 A1 | 2/2013 | Tonchev |
| 2013/0207118 A1 | 8/2013 | Xiao |
| 2016/0064698 A1 | 3/2016 | Lee |
| 2016/0220221 A1 | 8/2016 | Gauntt |
| 2017/0316916 A1 | 11/2017 | Stevens |
| 2017/0337060 A1 | 11/2017 | Yamanaka |

OTHER PUBLICATIONS

Bobin, et al.; "Compressed Sensing in Astronomy", IEEE J. Sel. Topic in Sig. Proc. 2.5 (2008): 718-726 (9 pages).

Shen, et al.; "Spinning disk for compressive imaging," Optic Letters 37.1 (2002): 46-48.

Skinner; "Coded mask imagers when to use them- and when not," New Astronomy Reviews 48.1-4 (2004): 205-208 (6 pages).

Starck, et al. "Compressed Sensing in Astronomy", (2008): 1-38 (retrieved: May 30, 2019; https://convexoptimization.com/TOOLS,CompressSensingAstro.pdf) (38 pages).

Extended European Search Report dated Dec. 9, 2021 corresponding to related EP Application No. 21191107.8, 9 pages.

Althouse et al., "First Flight of a New Balloon-Borne Gamma-Ray Imaging Telescope," Proceedings of the 20th International Cosmic Ray Conference, vol. 1, Jan. 1, 1987, pp. 84-87, XP055865252.

GAMMA-RAY IMAGING

RELATED APPLICATIONS

This application is a continuation of U.S. application Ser. No. 15/313,101 filed 21 Nov. 2016, which is a 35 U.S.C. § 371 National Phase Application of Int'l App No. PCT/AU2015/000302 filed May 22, 2015, which claims the benefit of the filing date and priority of Australian patent application no. 2014901905 filed 22 May 2014, the content of which as filed is incorporated herein by reference in its entirety.

FIELD OF THE INVENTION

The invention pertains to radiation detection and imaging, and in particular to a compressed sensing gamma-ray or neutron imaging device with a detector and one or more coded masks.

BACKGROUND OF THE INVENTION

Gamma-ray imaging is an important radiation detection capability that can provide the location and identity of gamma-ray emitting radionuclides. Gamma-ray imaging can be utilised in many applications, including but not limited to: decommissioning, decontamination, environmental monitoring (i.e. site surveys, mining surveys), medical imaging (SPECT), astronomy and national security applications (i.e. search for illicit radiological & nuclear material).

Traditional gamma-ray imaging techniques rely on either focusing an image onto very expensive arrays of detectors or slowly raster scanning a single detector across the image plane. The expense of pixelated detector arrays or slow speeds of raster scanning systems are often prohibitive. Unlike optical photons, which are easily focused, the highly penetrating nature of gamma-ray photons make them very difficult to focus. Gamma-ray imaging systems that use pixelated detector arrays typically use a single pinhole, multiple pinhole or planar coded aperture optics. These systems are used to form an image or an encoded image on the detector array. The use of pinhole and coded aperture optics has been around for decades in astronomy and medical applications. The fields of view of these types of imaging systems are approximately 30°-40° in the horizontal or vertical direction.

Rotating Modulation Collimators (RMCs), first introduced by Mertz in 1967, typically use two masks with parallel slits that run the entire length of the mask. When the masks are rotated, the projection of the front mask appears to orbit the rear mask with respect to the source. The rotation of the masks creates a modulated count pattern at the detector that depends on the number of sources, source intensity, location and size. The RMC has a number of drawbacks, including: a single RMC has difficulty imaging extended sources, it has a small field of view, when using a single RMC it is impossible to distinguish a source on the central axis of rotation (see B. R. Kowash, *A Rotating Modulation Imager for the Orphan Source Search Problem*, PhD Thesis, 2008).

The scenes to be imaged in many gamma-ray imaging applications are sparse in nature and typically require the detection of one or more point sources. For the simple case of a single point source that will be sampled into a 16×16 image and, assuming background is zero, this will provide 1 non-zero pixel and 255 zero pixels. Rather than taking N (in this case 256) measurements, most of which will be zero, intuition says that smarter strategies should be able to determine the location of the non-zero pixel in far fewer than N measurements. This intuition has recently been proven through the development of a new signal processing theory, known as Compressed Sensing. Compressed sensing is enabling new approaches to image formation. The Compressed Sensing approach can produce images with a fraction of the measurements (when compared to traditional imaging techniques) and enables low cost (single detector) system options to be realised. Single pixel imaging systems, based on compressed sensing, have been recently developed for optical, infrared and THz wavelengths (see R. G. Baraniuk et al., Method and Apparatus for Compressive Imaging Device, U.S. Pat. No. 8,199,244 B2, 2012).

For example, a terahertz imaging system is known that uses a single pixel detector in combination with a series of random masks to enable high-speed image acquisition (see W. L. Chan et al., *A Single-Pixel Terahertz Imaging System Based on Compressed Sensing*, Applied Physics Letters, Vol. 93, 2008). These single pixel imaging systems all use some sort of lens to focus an image and then use random compressive measurements to sample the image plane. However, it should be possible to perform compressive measurements when sampling the scene plane rather than forming an image and then sampling. Huang et al. have taken this approach and describe a single pixel optical imaging system that requires no lens; they use an aperture assembly to randomly sample the scene and at no stage form a 'traditional' image (see G. Huang et al., *Lensless Imaging by Compressive Sensing*, 2013).

OBJECTS AND SUMMARY OF THE INVENTION

It is an object of the invention to provide a gamma-ray imaging device that takes fewer measurements than prior gamma-ray imaging techniques. Images of a scene can be produced with fewer measurements than the number of pixels in the image.

It is another object of the invention to provide a gamma-ray imaging device having a larger field of view than prior aperture based gamma-ray imaging techniques.

It is an object of the invention to provide a mask apparatus that can randomly sample a scene for gamma-rays. These random projections of the scene can be used to reconstruct images.

Accordingly, there is provided an imaging apparatus comprising a single detector surrounded by one or more rotating masks.

In preferred embodiments, the masks are cylindrical, hemispherical, or segments of spheres, or spheres.

BRIEF DESCRIPTION OF THE DRAWINGS

In order that the invention may be better understood, embodiments will now be described, by way of example, by reference to the accompany drawing in which.

DETAILED DESCRIPTION

Imager Layout and Sensing

Figure 1:
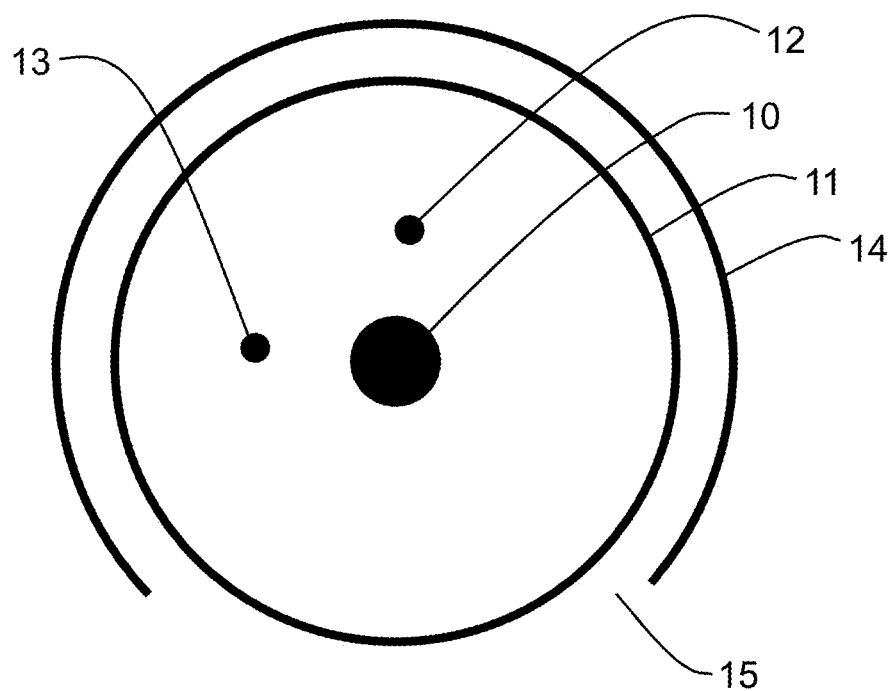
FIG. 1 is a schematic diagram of a single detector, mask and 270° shield.
Figure 2:
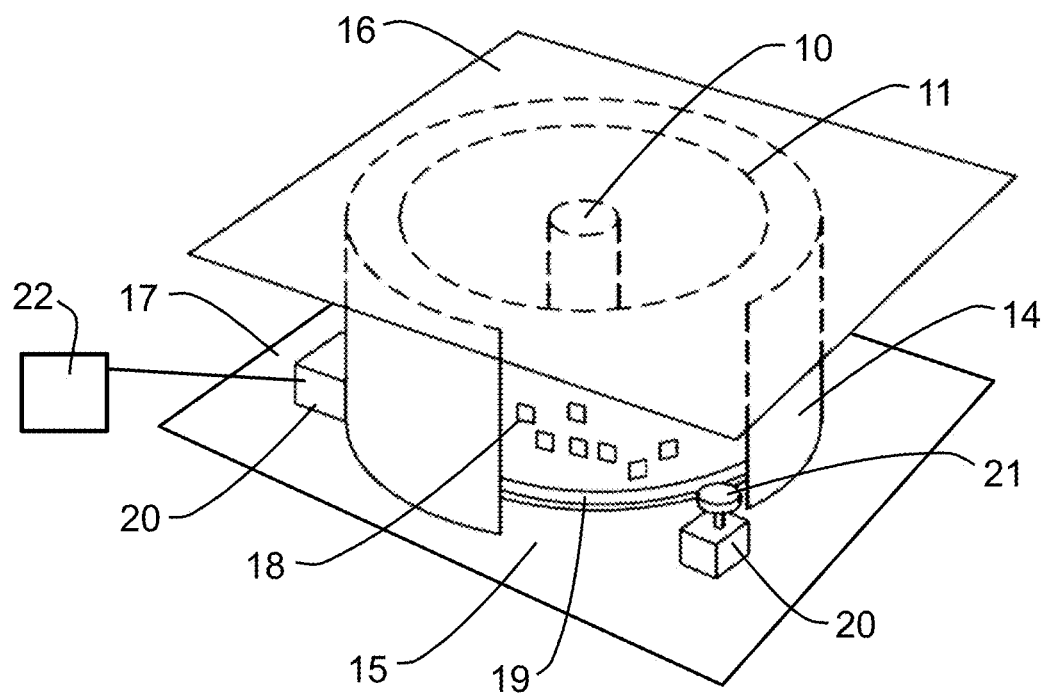
FIG. 2 is a schematic diagram of the single detector, mask and shield of FIG. 1, showing additional top and bottom shields

As shown in FIGS. 1 and 2, a single gamma-ray detector 10 is located at the centre of a mask 11 that encircles or encloses the detector 10. The detector is located centrally of the mask or masks preferably the detector occupies a centre or axis of rotation of the mask 11. A cylindrical or spherical mask 11 may be used. Although a non-central detector position can be used, it will have a slightly different field of view. More than one detector 12, 13 can be used and these additional detectors can be in different positions. Using multiple detectors can reduce the imaging time.

An optional cylindrical or other radiation shield 14 may have an arcuate opening 15 for limiting the field of view to an arc defined by the opening 15. The mask 11 may be indexed or rotated by a stepper motor driven turntable 19 or directly geared stepper motor 20 or otherwise to suit the coded mask or optic methodology being employed. Through the use of stepper motors 20, gearing 21 and a control computer 22 having for example display and print capabilities for generating an image from the collected and processed data, the data collection and coordinated motion/rotation of the mask can be automated. The motion of the mask may be in discrete steps or in a continuous movement.

As shown in FIG. 2, when a cylindrical mask 11 is used, the top and bottom usually need to be covered by a shield 16, 17, so that the only radiation reaching the detector is through the open apertures 18 of the mask 11 that are not otherwise shielded.

The compressed sensing gamma-ray imager may be used in conjunction with any gamma-ray sensitive sensor 10, 12, 13. The typical gamma-ray detector systems based on materials such as Sodium Iodide (NaI), Caesium Iodide (CsI), Bismuth Germanate (BGO), Cadmium Telluride (CdTe), Cadmium Zinc Telluride (CZT), High Purity Germanium (HPGe), Strontium Iodide ($SrI_2$) and CLYC may be used. Spectroscopic detectors that determine the energy of each measured photon can be used to identify the radionuclide being imaged. Non-spectroscopic detectors that just record gross counts will provide general information on radiation hotspots. Other radiation detection equipment, such as dose rate meters, could be used as the sensor and in this case would map the dose in the field of view.

The preferred embodiment uses a spectroscopic detector that measures the energy of each gamma-ray photon detected. The photon count values from any particular energy bin or energy bin range can be used as the observed data from a set of measurements. The reconstruction of observed photon count data for a given peak region of interest (e.g. the 60 keV $^{241}$Am line) will provide the location of the $^{241}$Am, provided the radionuclide is present. The reconstruction of observed photon data for additional regions of interest can give the location of additional radionuclides.

A compressed sensing neutron imager may be used in conjunction with any neutron sensitive sensor or sensors 10, 12, 13.

Dual modality sensors 10, 12, 13, including but not limited to CLYC, may be used to measure the modulation of both the gamma-rays and neutrons.

It will be appreciated that the teachings of this invention may be applied to radiation of any wavelength (or of any particle) by using the appropriate mask and detector.

Mask and Mask Apertures

Mask pattern openings or apertures are preferably arranged in rows and columns. The location of mask pattern openings 18 may, for example, be produced randomly. For example, in a 16×16 possible aperture mask there are a total of 256 numbered apertures. A random number generator is used to randomly select 128 of the aperture numbers between 1 and 256. These 128 numbers are then set to be the open apertures. The remaining 128 locations (from the original 256 numbers) are set as zero (closed). This provides a mask pattern that is 50% open. For rotational masks, where the mask columns are indexed or rotated, the random selection of open/closed apertures may be made for each row rather than the whole mask. This would ensure that each mask row is 50% (for example) open and would prevent situations where a row has too many or too few open apertures, which may impact on the image reconstruction.

The geometry of the system will define the spatial resolution. The aperture size should preferably be equal to or greater than the detector dimensions. For example, a system may have apertures 18 with dimensions of 0.5 cm×0.5 cm and the cross-sectional area of the detector should also be 0.5 cm×0.5 cm or less. The further away the detector is from the mask, then the better the spatial resolution.

Detectors with dimensions larger than those of the aperture may be used, however, for this case there will be an increased overlap between the fields of view of adjacent apertures. This overlap (which is a degradation/blurriness in the spatial resolution) can be removed by deconvolving the response function of the mask.

The preferred aperture cross-sectional shape is square. The preferred number of apertures is a power of 2 (i.e. 64, 128, 256, 512, 1024), although it is not essential. It is preferred that there be minimal or no separation between the mask apertures.

The thickness of the mask will depend on the application. For the imaging of high energy photons (for example the 1.3 MeV photons from $^{60}$Co) a total mask thickness of 2 cm of lead would attenuate approximately 72% of the 1.3 MeV photons.

The mask materials are made from a body material that can sufficiently modulate the intensity of the incoming radiation. For high energy gamma-rays the materials will typically be high in atomic number (Z) and high in density, which would absorb (attenuate) the gamma-ray radiation. Typical materials could include but not be limited to tungsten, lead, gold, tantalum, hafnium and their alloys or composites (e.g. 3D printing—mixing tungsten powder with epoxy). For low energy gamma-ray photons, low to medium Z materials, such as steel, are sufficient to modulate the photon intensity. In a preferred embodiment the mask material will attenuate the photons in order to modulate the photon intensity. Other embodiments may use other interaction mechanisms, such as Compton scattering, if they show an appreciable modulation in photon intensity.

For imaging of neutron radiation, the mask body will need to modulate the neutron intensity and therefore mask materials will require a high neutron interaction cross-section. Neutron mask body materials may include but not be limited to: Hafnium, Gadolinium, Cadmium, Boron doped materials, Hydrogen rich materials and their combinations.

Masks may be designed from materials that would enable the modulation of both gamma-rays and neutrons. A single material such as Hafnium may be suitable to modulate the intensity of both gamma-rays and neutrons. Use of multiple materials, for example, a combination of Tungsten and Cadmium, may be suitable to modulate the intensities of both gamma-rays and neutrons. The open apertures, for the gamma-ray mask, may consist of some hydrogen rich material which does not influence the modulation of the gamma-ray intensity. These hydrogen rich apertures would then represent the closed apertures or modulating regions for the neutron mask. By extension, these mask materials could be used to modulate the intensity of any EM wavelength (i.e. optical, infrared, THz, etc.) or any particle (i.e. electrons, protons, etc.).

Figure 11:
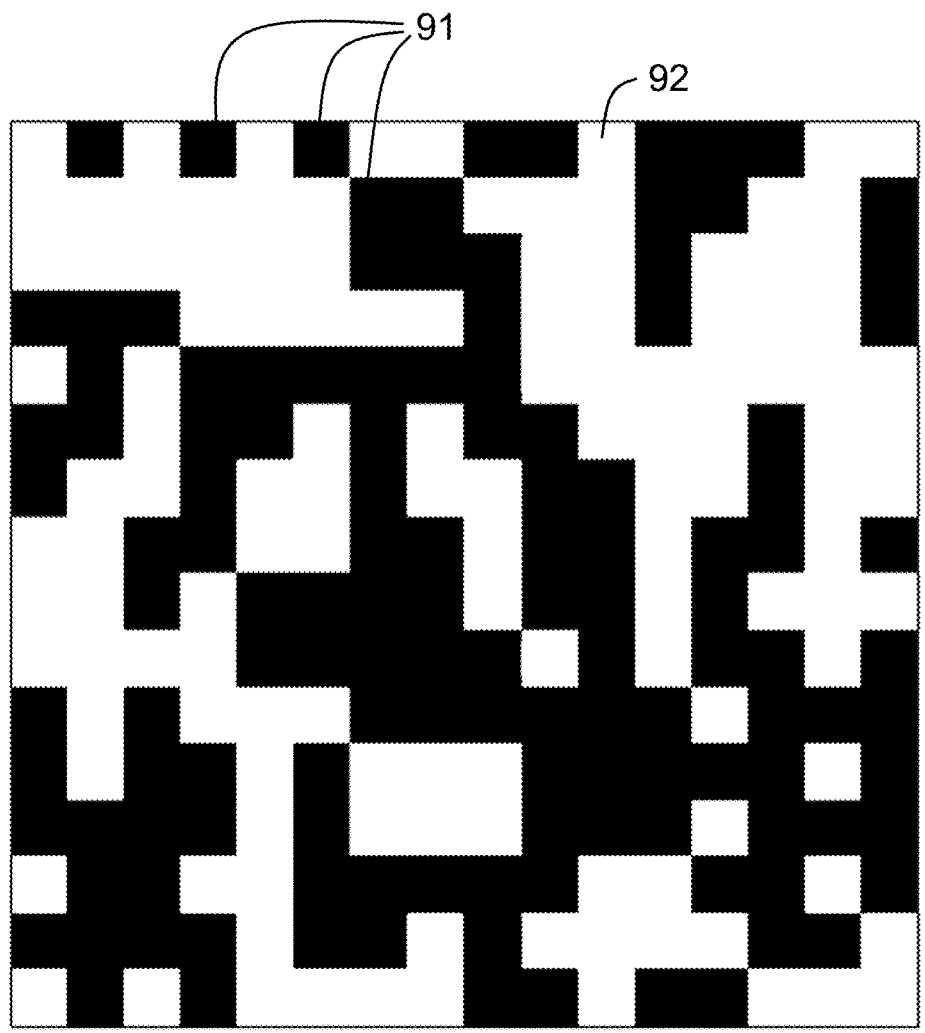
FIG. 11 is a schematic diagram of a coded mask with separate gamma-ray and neutron blocking elements.

As shown in FIG. 11, a coded mask is capable of modulating both gamma-rays and neutrons separately, that is, some mask regions being used to block gamma-rays only and some mask regions being used to block neutrons only. In the example of FIG. 11, one sub-set of mask regions 91 (represented in solid shading) are fabricated from a material that modulates gamma-rays only. Another sub-set of mask regions 92 (represented without shading) modulates only neutron and not gamma-rays. Masks of this type may be fabricated in accordance with any of the techniques and materials, shapes or configurations disclosed by or suggested by this specification.

Masks may be singular or multiple and nested, rectangular, circular, arcuate, hemispherical or spherical. Consecutive measurements required for coded mask sensing will require a new mask pattern obtained by replacing a current mask with a new one or using some form of rotation of the mask or masks. Flat mask shapes will have a limited field of view as they are only looking in the forward direction, with the field of view angle determined by the detector and mask geometry.

The advantage of arcuate, cylindrical or spherical masks is that large fields of view (FOV) are possible. Current commercially available pinhole/coded aperture gamma-ray cameras have horizontal and vertical FOV between approximately 30° and 40°. An upright cylindrical mask embodiment would have a horizontal FOV of 360°, a hemispherical mask embodiment would have a $2\pi$ FOV and a spherical mask embodiment would have a nearly $4\pi$ FOV. Other embodiments may include but not be limited to: ellipsoid, cone, cuboid or hexagonal shaped masks.

In the case of a single cylindrical mask embodiment, the rotation of the mask by one column would constitute a new mask pattern viewing the desired FOV for a new measurement. For a single cylindrical mask embodiment, a radiation shield can be used to restrict the FOV and therefore have a large number of columns to enable more measurements (see FIG. 2). The down side to the single cylindrical mask approach is that more columns are required to perform more measurements, which increases the diameter of the cylinder and the physical size of the whole system.

Figure 3:
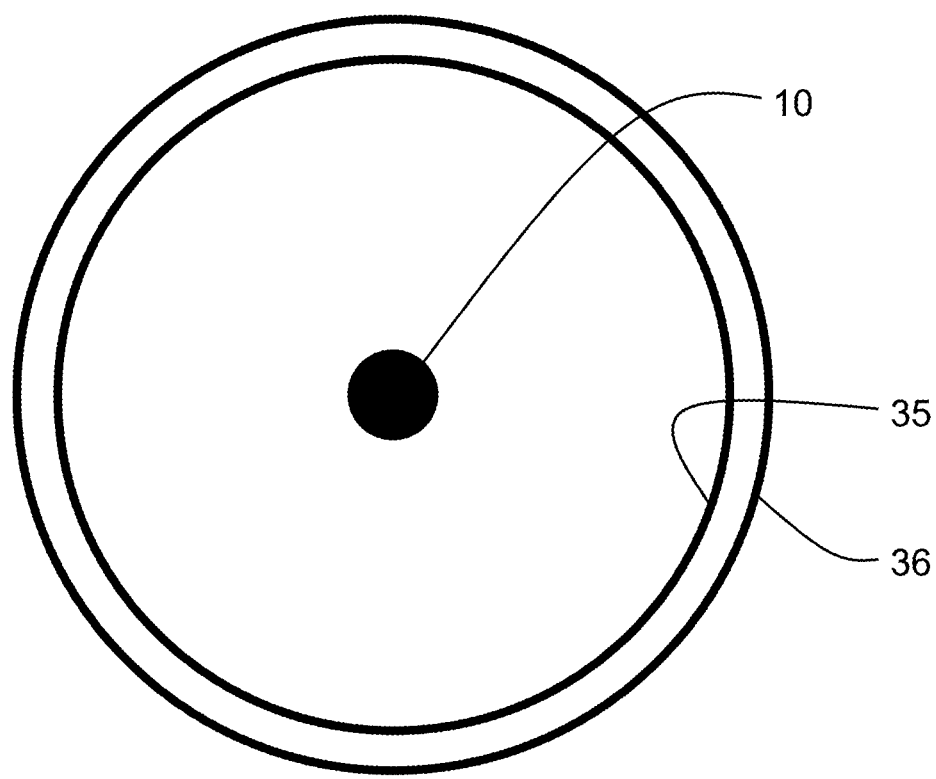
FIG. 3 is a schematic diagram of a single detector and two nested, rotating cylindrical masks.

As shown in FIG. 3, an approach utilising a nested or mask within a mask (or dual or multiple mask approach), where each mask body 35, 36 can move or be indexed by the computer 22 independently, enables far more measurements from the number of possible combinations of the two mask patterns. In a preferred embodiment the dual mask approach would consist of a cylinder within a cylinder (see FIG. 3). Each mask is rotated independently in the manner suggested for a single mask in FIG. 2 about a sensing axis or imaging axis along which a detector may be located. The large number of mask patterns (and therefore measurements) would allow for a more compact system (less total columns in one cylinder) that could image a 360° FOV. A similar argument for dual hemispherical and spherical mask designs can also be made. For the dual mask approach, the combined open fraction of the mask may approximate 50%, but there will be a variation in this as the masks are rotated. One mask may be indexed in rotation angle for a full revolution before the other mask is indexed by a single column, thus generating a number of virtual masks, being the number of columns squared. In other embodiments the masks are counter-rotated by one column in an alternating or non-alternating arrangement. Each virtual mask is used for a radiation measurement before the next mask is generated. Each mask need only rotate in one direction.

The cross-sectional or projected shape of the mask apertures may include but not be limited to: square, rectangular, circular, triangular and hexagonal. There may or may not be separation between the mask apertures. In a preferred embodiment of a single mask system, the mask aperture shape is square.

Figure 4:
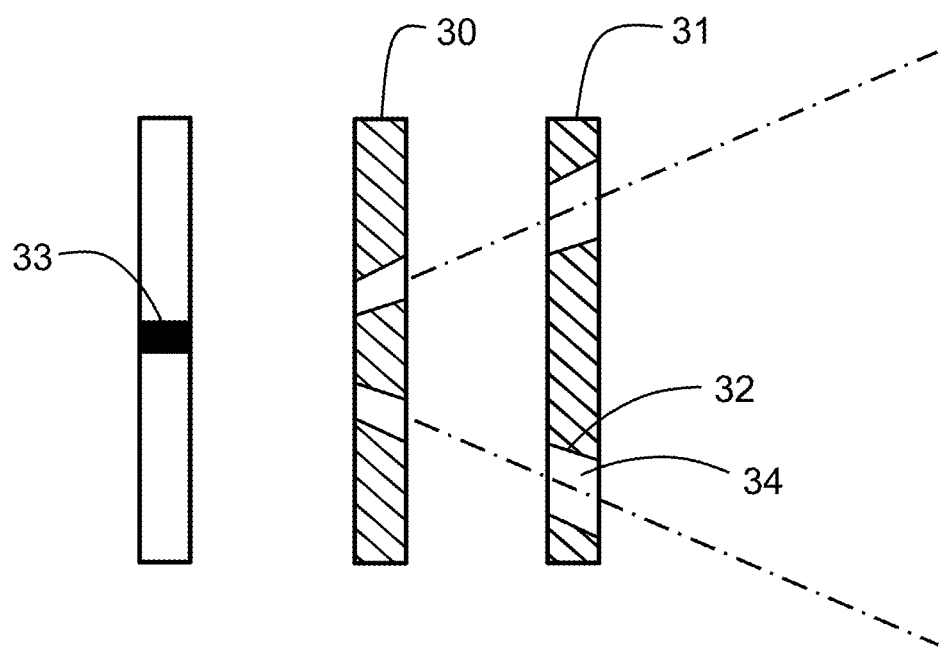
FIG. 4 is a schematic diagram of a single detector and two concentric masks showing alignment and tapering of apertures.

As shown in FIG. 4, for a dual mask embodiment the dimensions and orientation of the inner 30 and outer mask 31 may be different, such that they are tapered 32 (but aligned as to their edges) to produce the same FOV for both the inner and outer masks relative to the detector 33. The 3 dimensional shapes of these apertures 34 may include but not be limited to a trapezoidal prism and a cone.

Figure 5:
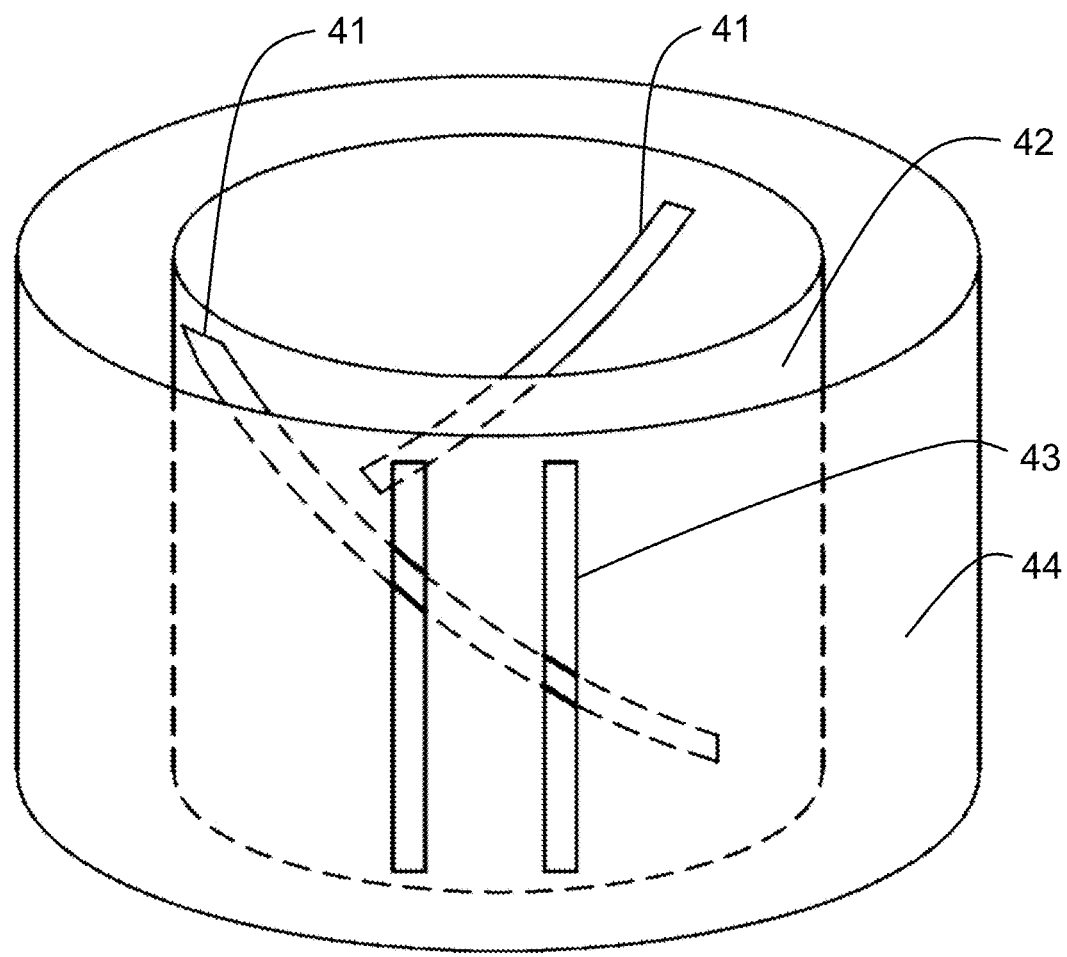
FIG. 5 is a schematic diagram two concentric masks showing moving slots as an aperture system.

As shown in FIG. 5, the open apertures may be formed through the overlapping of continuous open structures, in the form of spiral lines 41 or some other structure on one mask and another shape such as a vertical slit 43 on the other mask. Rotation of the masks 42, 44 relative to one another produces a coded aperture.

The mask pattern may be random, pseudo-random, non-random or deterministic in design. The mask pattern will typically be required to meet the defined conditions for compressed sensing to work. A representation of the mask pattern, in matrix form, will be used in the reconstruction process. The sensing matrix used in the reconstruction may be a Circulant or Toeplitz matrix, which may provide a faster computational time. In a preferred embodiment a pseudo-random mask pattern is generated where each mask element has an equal probability to be either 1 (open—100% transmission) or 0 (closed—0% transmission). The percentage transmission for a closed mask element should be some value less than 100%, for example, preferably 0% but a transmission of 50% will still be enough to effectively modulate the intensity to reconstruct an image. The percentage transmission relates to the increased penetrating nature of higher energy gamma-rays. For example, a closed mask element consisting of 10 mm lead may have 0% transmission for 60 keV gamma-ray photons, but its percentage transmission may be approximately 53% for 1332 keV gamma-ray photons. There will be a point where the transmission percentages for the open and closed apertures are too close together to modulate the photon intensity enough to reconstruct an image. As an example, transmission percentages of 100% and 90%, for open and closed apertures respectively, may be too close together for sufficient modulation in the photon intensity. There may be more than two levels of transmission within the mask for a given energy, for example, three levels of transmission may be 33%, 66% and 100%. Other levels of transmission may be 25%, 50%, 75% and 100% or 0.16%, 4% and 100%. In the latter example, the proximity of the two lower transmissions states will effectively cause the three levels of transmission to resemble two levels, potentially providing quicker reconstruction times, higher quality reconstruction and few measurements. The levels of transmission may cover two or more levels between 0% and 100%. The sensing matrix values may be the attenuation values for particular gamma-ray energies. Different attenuation values and therefore different sensing matrices may be used for reconstructions at different gamma-ray energies.

Figure 6:
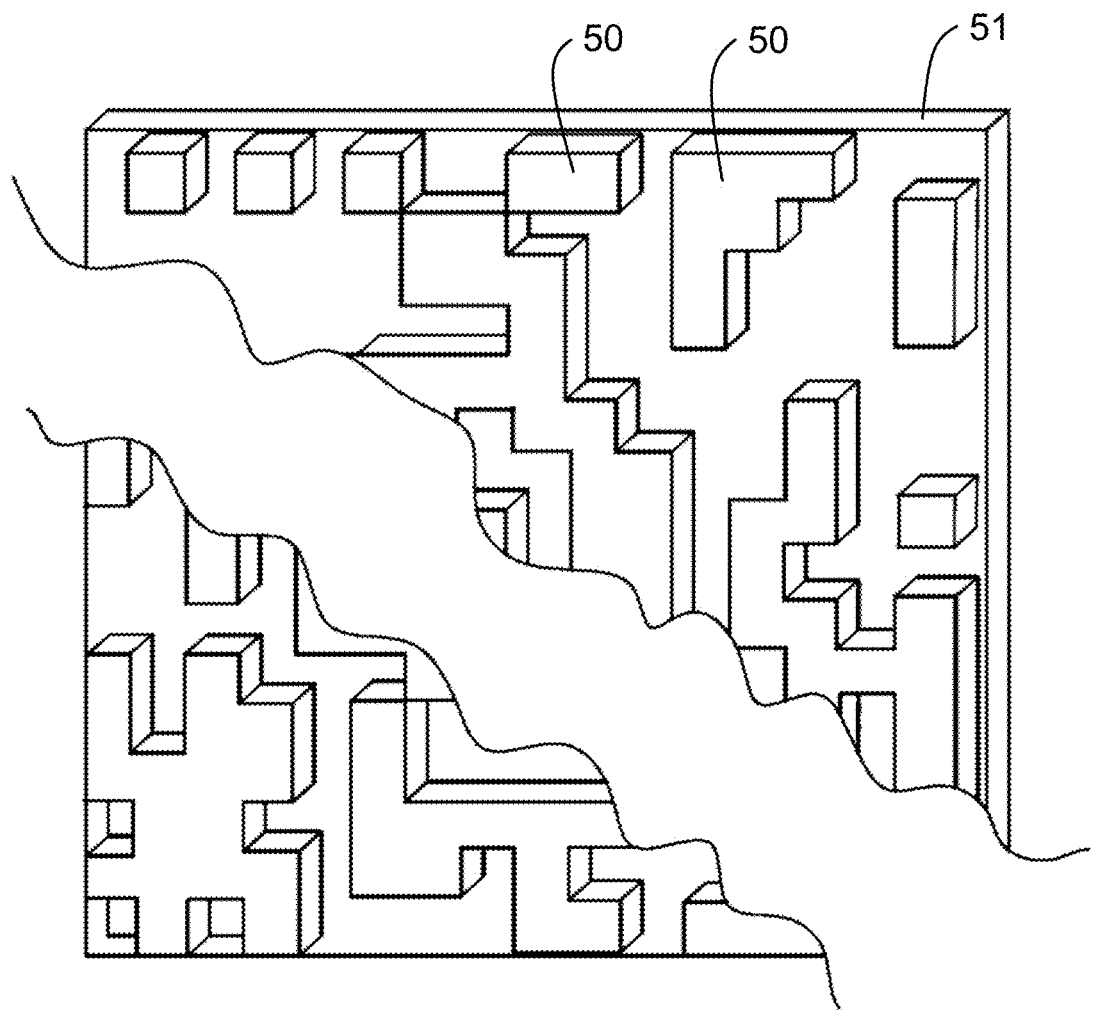
FIG. 6 is a schematic diagram of a mask having floating elements bonded to a substrate.

As shown in FIG. 6, the mask pattern for any shape mask may be generated such that mask structure is self-supporting. For example, mask patterns with an array of floating or unattached "closed" elements 50 are fixed, adhered or attached to a non-masking substrate 51. Thus the radiation opaque mask elements 50 need not be attached to one another other than by the substrate 51. Alternatively, mask patterns with no floating or unattached "closed" elements 50 may be selected, which would not require a substrate 51, but would require the outer closed elements 50 to be attached to a common structure.

Figure 7:
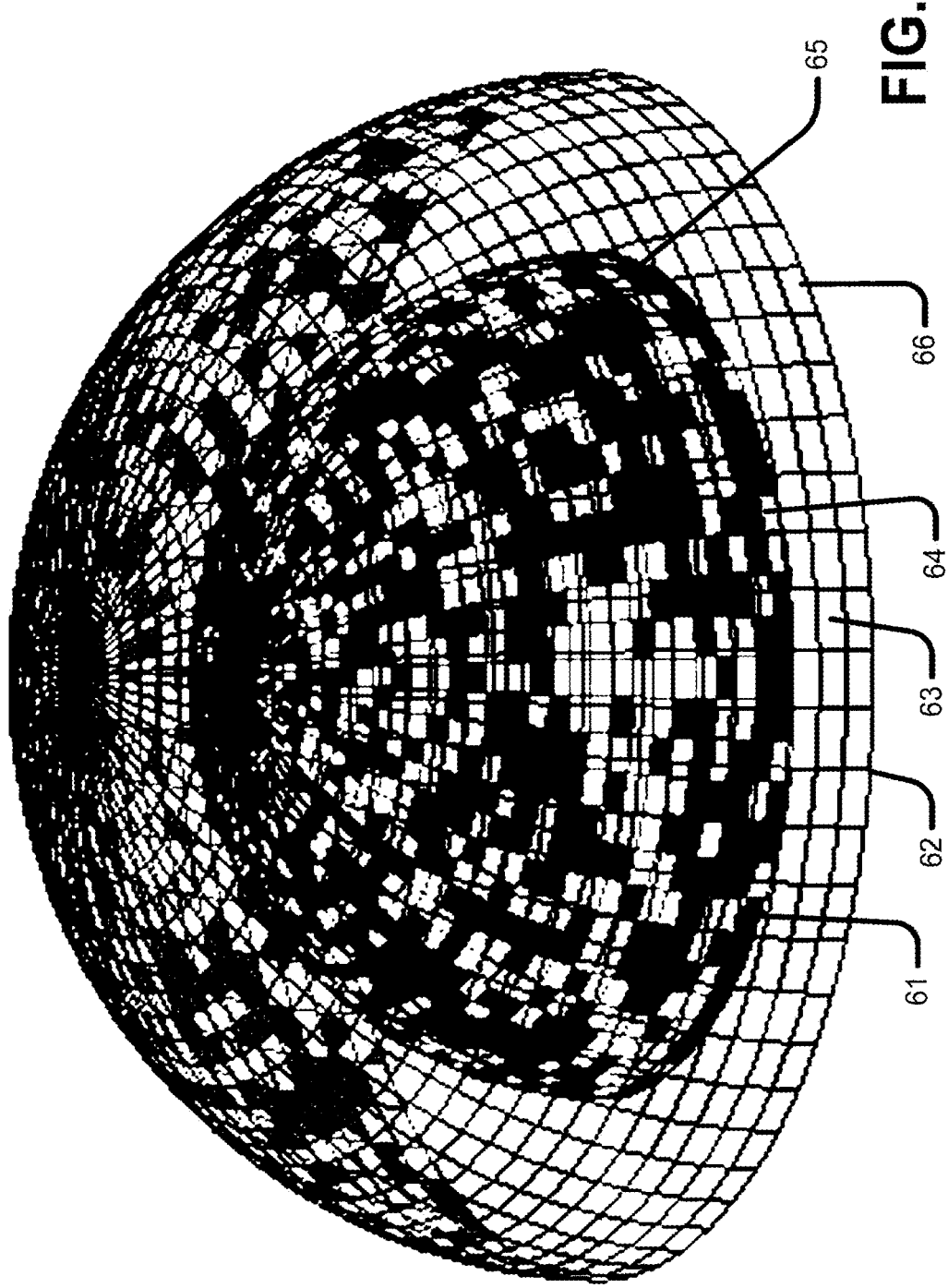
FIG. 7 is a schematic diagram of a single detector and two concentric hemispherical masks above a common plane.
Figure 8:
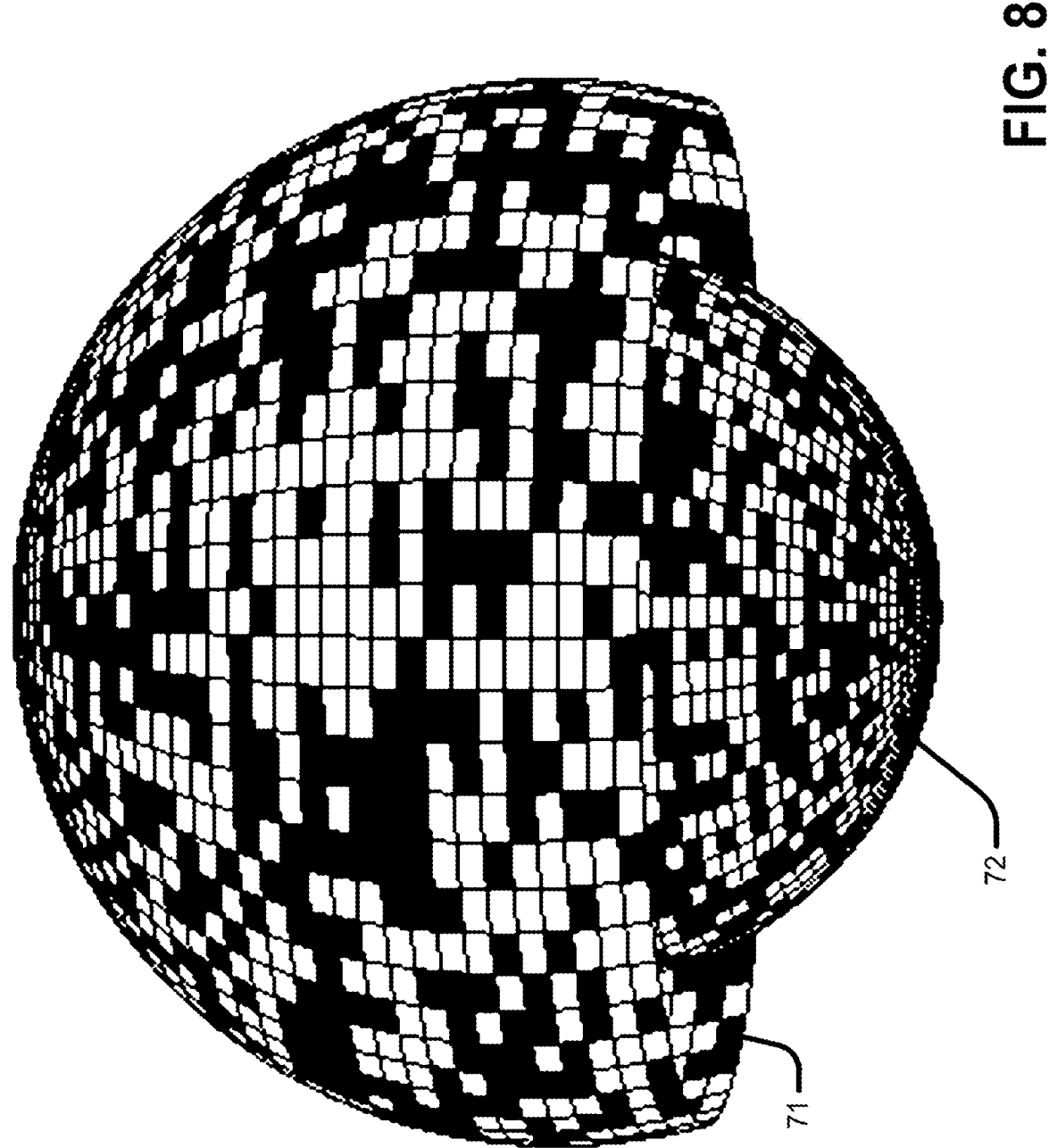
FIGS. 8 and 9 are schematic diagrams of nested spherical masks.
Figure 9:
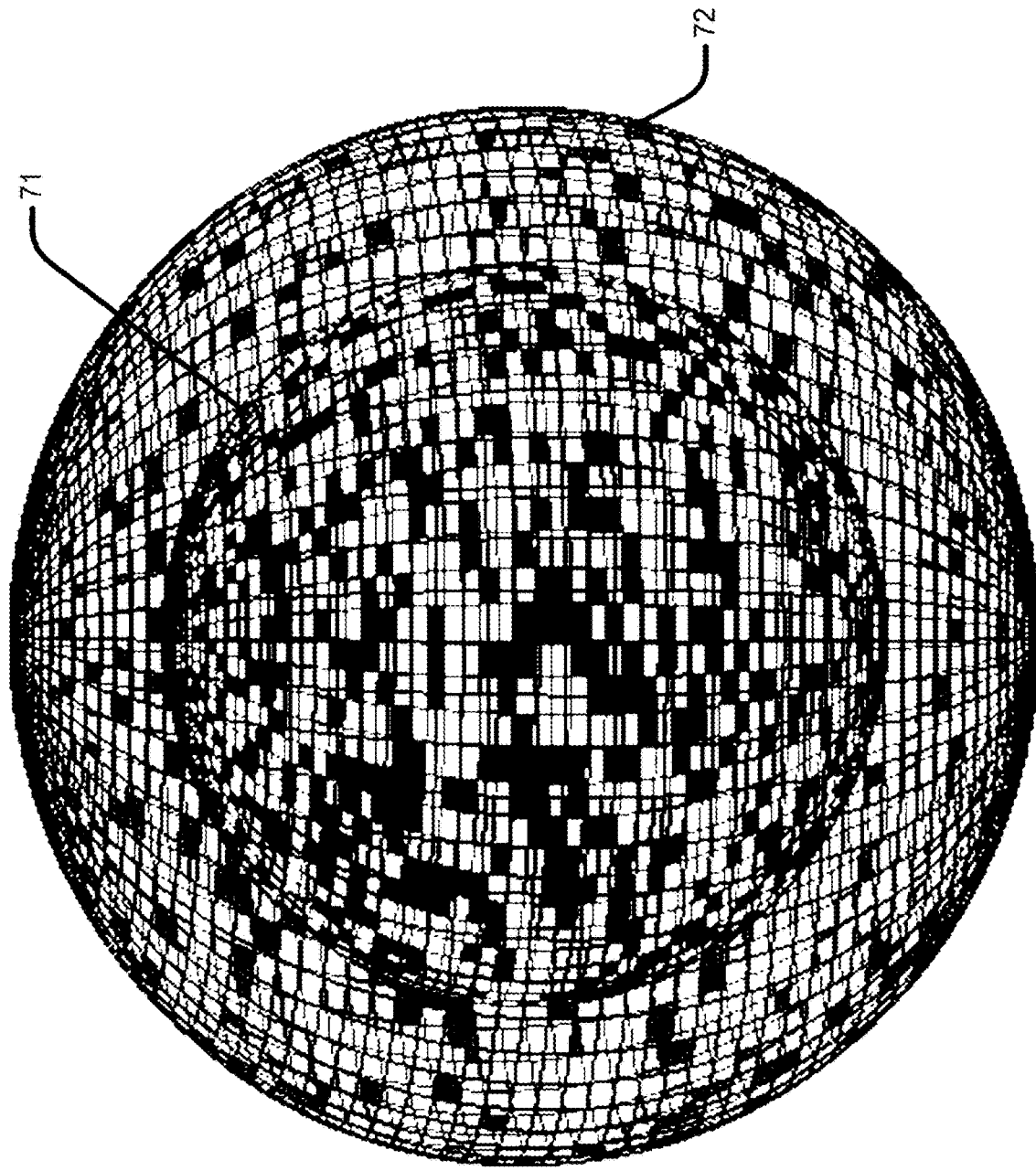

As shown in FIGS. 7 to 9, the mask or masks may be hemispherical, spherical or a part of a sphere such as a cap above any given secant plane or optionally a segment between two planes. FIG. 7 shows two nested and concentric masks in the shape of spherical caps, an inner cap 61 and an outer cap 62, both being hemispheres with the rims (or lowest rows) of both in a common plane. One or both masks 61, 62 are rotated into data sampling positions wherein the columns 63, 64 and the rows of both are aligned or in registry when data is sampled or acquired. Both have the same number of columns and rows. Each row occupies a zone of a sphere between two parallel planes. In one example, the inner hemispherical mask 61 is indexed by one column in one direction and the outer mask 62 is indexed or rotated by an angle defined by a single column in the opposite direction, consistent with FIG. 3. Having both masks move simultaneously offers greater variability in which mask elements are open or closed when compared to having one mask stationary and the other mask moving. This arrangement allows for single detector coded mask imaging of the entire space above the plane that includes the rims 65, 66.

FIGS. 8 and 9 illustrate the use of two masks or optionally two pairs of nested masks 71, 72 that are spherical and concentric. In this way, all of the space around the central detector or detectors can be imaged. Each spherical mask or mask pairing 71, 72 may be formed from 2 hemispherical masks or mask pairings as shown in FIG. 7. Each mask in the arrangement will have its own drive system comprising a turntable or stepper motor arrangement, driven by the system's computer 22 (see FIG. 2).

Mask Geometrical Design

The mask design will be dictated by the requirements of the radiological imaging application in question. The geometry of the system will influence the system performance such as spatial resolution, FOV and sensitivity. The geometrical parameters of importance include: the detector dimensions, the detector to mask distance, the aperture dimensions (i.e. thickness, length and width), the mask to source distance, the septal thickness, the number of mask apertures and the angle subtended from the centre of the detector and two neighboring mask apertures. For example, a smaller mask aperture will provide a higher spatial resolution.

Reconstruction Algorithm

There are a large number of reconstruction algorithms that have been used for compressed sensing. For example, there are gradient projection methods, iterative shrinkage/thresholding methods and matching pursuit methods (see R. M. Willett, R. F. Marcia and J. M. Nichols, *Compressed Sensing for Practical Optical Imaging Systems: a Tutorial*, Optical Engineering Vol. 50(7), July 2011). Any of these methods or some other appropriate method can be used for reconstructing the compressed sensing measurements. The ANSTO compressed sensing implementation used the Gradient Projection for Sparse Reconstruction (GPSR) algorithm (see M. A. Figueiredo, R. D. Nowak, S. J. Wright, *Gradient Projection for Sparse Reconstruction: Application to Compressed Sensing and Other Inverse Problems*, Journal of Selected Topics in Signal Processing, December 2007).

Image Fusion

The gamma-ray image that is generated after the compressed sensing measurements may be overlayed with an optical image that is registered to the same field of view. The neutron image may be overlayed with an optical image. The overlayed radiation images with an optical image will help the user to visualise the location of the radiation sources. The radiation images may be overlayed with images at any other wavelengths (e.g. infrared).

Method

Figure 10:
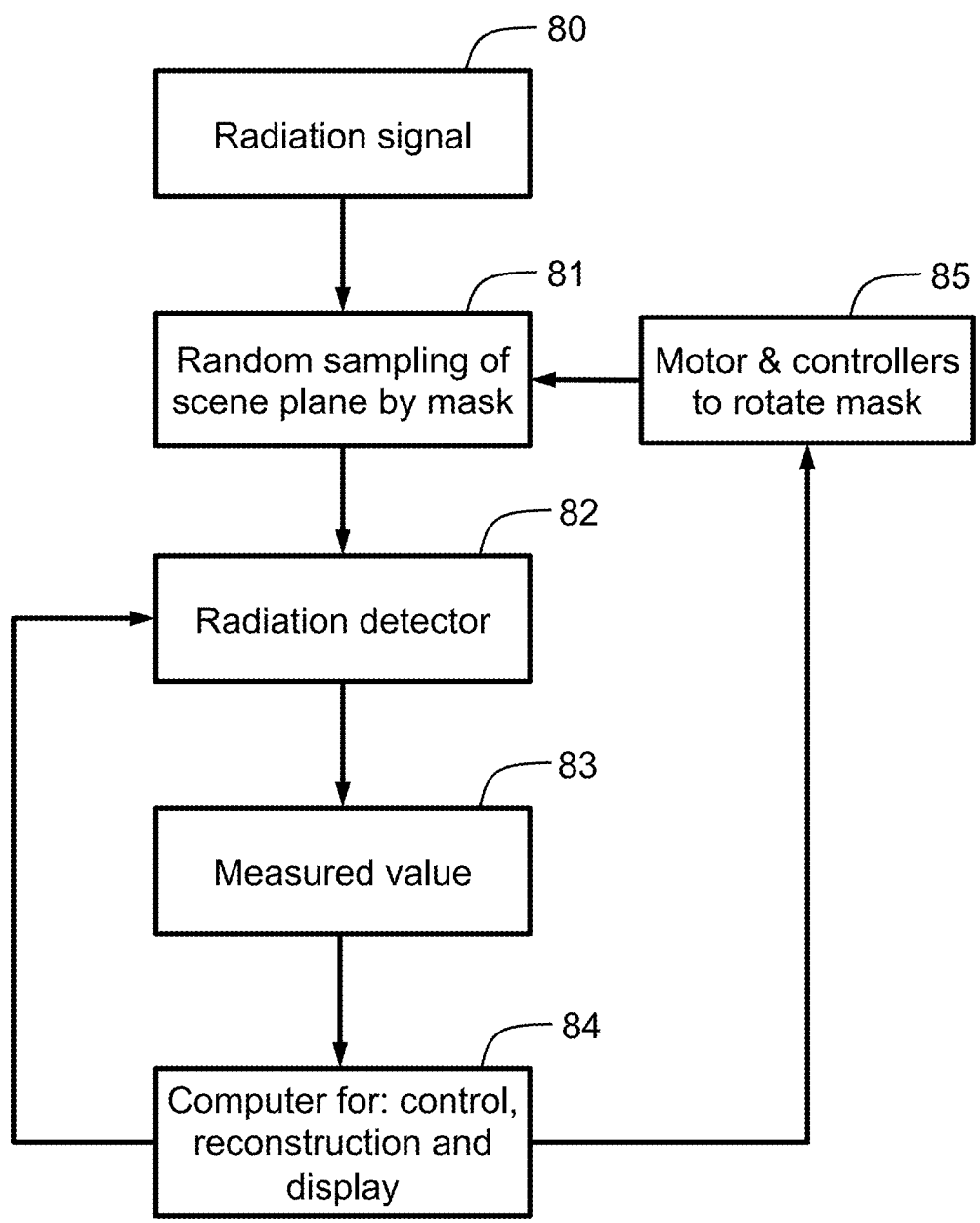
FIG. 10 is a flow chart illustrating a method of operation of the invention.

As shown in FIG. 10, a source emits radiation 80. That radiation 80 passes through a mask or masks 81 as previously disclosed. The system's computer 22 causes the detector 10 to operate or takes a reading from an operating detector 82. The detector then transmits a measured value 83 to the computer 22. The computer saves and uses the value and the positioning of the mask or masks to compile data that will be reconstructed into an image. The computer then causes the motor or motors controlling the mask or masks to rotate or index to the next measurement position. Radiation then passes through, in effect, a new mask or mask orientation 81 as the process is repeated. Although the invention has been described with reference to specific examples, it will be appreciated by those skilled in the art that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner. Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller or computing system, or similar electronic computing or signal processing devices, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided by way of example and not as limitations to the scope or spirit of the invention.

What is claimed is:

1. A mask apparatus for use in compressed sensing of incoming radiation, the mask apparatus comprising:
   a coded mask having a body portion comprised of a material that modulates the intensity of the incoming radiation;
   wherein the coded mask has a plurality of mask aperture regions that allow a higher transmission of the radiation relative to said body portion, the higher transmission being sufficient to allow reconstruction of compressed sensing measurements;
   wherein the coded mask is configured to rotate relative to the mask apparatus.

2. The mask apparatus of claim 1, wherein the coded mask is rectangular, circular, arcuate, cylindrical, hemispherical, segments of spheres, or spherical.

3. The mask apparatus of claim 1, wherein the coded mask is formed:
   i) from a material that modulates incoming gamma-ray radiation;
   ii) from a material that modulates incoming optical or infrared radiation;
   iii) from a material that modulates incoming neutron radiation; or
   iv) from a material that modulates both incoming gamma-ray radiation and neutrons.

4. The mask apparatus of claim 1, wherein:
   some of the mask aperture regions are modulating regions for gamma-rays and some of the mask aperture regions are modulating regions for neutrons.

5. The mask apparatus of claim 1, wherein:
   a) the mask apparatus has a horizontal field of view of 360°; or
   b) the coded mask is hemispherical and the mask apparatus has a field of view of $2\pi$; or
   c) the coded mask is spherical and the mask apparatus has a field of view of nearly $4\pi$.

6. The mask apparatus of claim 1, further comprising a radiation shield formed of a material that modulates the intensity of the incoming radiation; wherein the radiation shield has an opening that limits a field of view of detection of the incoming radiation.

7. The mask apparatus as claimed in claim 6, wherein the radiation shield:
   a) is cylindrical; and/or
   b) has an arcuate opening that limits the field of view to an arc defined by the opening.

8. The mask apparatus as claimed in claim 1, wherein the coded mask is:
   a) cylindrical and comprises one or more spiral structures that comprise one or more mask aperture regions; or
   b) cylindrical and comprises two spiral structures that comprise one or more mask aperture regions.

9. The mask apparatus as claimed in claim 1, wherein:
   the coded mask comprises two spiral structures that comprise one or more mask aperture regions;
   the mask apparatus comprises a further coded mask having a cylindrical body portion comprised of a material that modulates the intensity of the incoming radiation, and one or more slits that allow a higher transmission of the radiation relative to the body portion of the further coded mask, the higher transmission being sufficient to allow reconstruction of compressed sensing measurements;
   the coded mask and the further coded mask are configured to rotate relative to one another; and
   rotation of the coded mask and the further coded mask relative to one another produces at least one coded aperture.

10. The mask apparatus as claimed in claim 1, wherein said modulation comprises attenuating or scattering said incoming radiation.

11. A mask apparatus for use in compressed sensing of incoming radiation, the mask apparatus comprising:
    a coded mask having a body portion comprised of a material that modulates the intensity of the incoming radiation;
    wherein the coded mask has a plurality of mask aperture regions that allow a higher transmission of the radiation relative to said body portion, the higher transmission being sufficient to allow reconstruction of compressed sensing measurements;
    wherein the coded mask is rectangular, arcuate, cylindrical, hemispherical, segments of spheres, or spherical; and
    wherein the coded mask is configured to rotate relative to the mask apparatus.

12. A radiation detection method, comprising:
    making compressed sensing measurements of radiation from one or more radiation sources with at least one radiation sensor and a mask apparatus, the mask apparatus comprising:
    a coded mask having a body portion comprised of a material that modulates the intensity of incoming radiation, the coded mask having a plurality of mask aperture regions that allow a higher transmission of the radiation relative to said body portion, the higher transmission being sufficient to allow reconstruction of compressed sensing measurements;

wherein the coded mask is configured to rotate; and the incoming radiation from the one or more radiation sources passes through the coded mask before detection by the at least one radiation sensor.

13. The radiation detection method as claimed in claim 12, wherein the coded mask is rectangular, circular, arcuate, cylindrical, hemispherical, segments of spheres, or spherical.

14. The radiation detection method as claimed in claim 12, wherein:

the mask apparatus comprises a further coded mask having a body portion comprised of a material that modulates the intensity of incoming radiation and a plurality of mask aperture regions that allow a higher transmission of the radiation relative to the body portion of the further coded mask, the higher transmission being sufficient to allow reconstruction of compressed sensing measurements;

the coded mask and the further coded mask are configured to rotate relative to one another; and the method further comprises:
a) indexing the coded mask in rotation angle for a full revolution, then
b) indexing the further coded mask by a single column.

15. The method of decommissioning, decontamination, environmental monitoring, medical imaging, astronomy or security, comprising a radiation detection method as claimed in claim 12.

16. A compressed sensing radiation imager, comprising:

at least one radiation sensor located within a mask apparatus that comprises:

a coded mask having a body portion comprised of a material that modulates the intensity of incoming radiation, the coded mask having a plurality of mask aperture regions that allow a higher transmission of the radiation relative to said body portion, the higher transmission being sufficient to allow reconstruction of compressed sensing measurements;

wherein the coded mask is configured to rotate;

wherein the imager is configured to make compressed sensing measurements of radiation from one or more radiation sources and to generate radiation image data from the compressed sensing measurements.

17. The radiation imager as claimed in claim 16, wherein the at least one radiation sensor comprises:

i) at least one gamma-ray radiation sensor, such that the radiation imager constitutes a gamma-ray radiation imager;

ii) at least one neutron sensor, such that the radiation imager constitutes a neutron radiation imager;

iii) at least one gamma-ray radiation sensor and at least one neutron radiation sensor, such that the radiation imager constitutes a gamma-ray radiation and neutron radiation imager;

iv) at least one dual modality sensor; or v) at least one dual modality sensor that senses both gamma-rays and neutrons.

18. The radiation imager as claimed in claim 16, further configured to capture an optical, infrared or other wavelength image and to output image data.

19. The radiation imager as claimed in claim 16, wherein the imager is configured to overlay the radiation image data and an optical or infrared image corresponding to a common field of view.

20. The radiation imager as claimed in claim 16, wherein the coded mask is:
a) rectangular,
b) circular,
c) arcuate,
d) hemispherical,
e) segments of spheres,
f) spherical,
g) cylindrical,
h) cylindrical and comprises one or more spiral structures that comprise one or more mask aperture regions, or
h) cylindrical and comprises two spiral structures that comprise one or more mask aperture regions.

21. The radiation imager as claimed in claim 16, wherein:

the coded mask is cylindrical and includes one or more spiral structures that comprise one or more mask aperture regions;

the mask apparatus comprises a further coded mask having a cylindrical body portion comprised of a material that modulates the intensity of the incoming radiation, and one or more slits that allow a higher transmission of the radiation relative to the body portion of the further coded mask, the higher transmission being sufficient to allow reconstruction of compressed sensing measurements;

the coded mask and the further coded mask are configured to rotate relative to one another; and rotation of the coded mask and the further coded mask relative to one another produces at least one coded aperture.

* * * * *